Patented Oct. 10, 1950

2,525,723

UNITED STATES PATENT OFFICE 2,525,723

ACID CHLORIDES OF POLYBASIC ACIDS

Norman Rabjohn, Akron, Ohio, assignor to Wingfoot Corporation, Akron, Ohio, a corporation of Delaware No Drawing. Application March 22, 1947, Serial No. 736,593

8 Claims. (Cl. 260—544)

This invention relates to a method of producing useful acid chlorides of polybasic acids and, in particular, the acid chlorides of polybasic acids having the carboxyl groups attached directly to an aromatic nucleus, such as isophthaloyl chloride and terephthaloyl chloride. In general, the method is useful in the preparation of acid chlorides having a plurality of acid chloride groups which are substituted in non-adjacent positions on the aromatic nucleus.

It is known that the acid chlorides of dibasic acids may be prepared from aromatic hydrocarbons with methyl substituents by chlorination in the presence of light to substitute three chlorine atoms on each methyl group and then hydrolyzing the resulting compound to convert the trichloromethyl groups to acid chloride groups. The latter step of this method has been conducted by adding water to the heated trichloromethyl derivatives. Although this procedure affords satisfactory yields of the desired acid chlorides, an extended reaction period is required to obtain these yields.

The purpose of this invention is to provide an improved hydrolysis whereby higher yields may be secured in very short reaction periods.

The method of this invention is applicable in the hydrolysis of compounds having the following structural formula

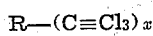

in which R is an aromatic hydrocarbon radical having a valence equal to $x$, $x$ is a small whole number from 2 to 5 inclusive, and the valence bonds are attached to non-adjacent carbon atoms of the R radical.

The trichloromethyl substituted aromatic hydrocarbons are prepared from hydrocarbons having the desired methyl substituents. Suitable methyl-substituted hydrocarbons useful in the practice of this invention are the para- and meta-xylenes, the dimethyl naphthalenes, the dimethyl diphenyls having the methyl groups on non-adjacent carbon atoms, and similar hydrocarbons having three or more methyl groups substituted in the aromatic nucleus, none of which are attached to adjacent carbon atoms, such as 1,3,5-trimethyl-benzene, 2,2',4,4'-tetramethyl-diphenyl, 1,3,5,7-tetramethyl-naphthalene, and the 2,4,6,3',5'-pentamethyl-diphenyl. The methyl-substituted hydrocarbons are customarily chlorinated in the presence of light which induces the substitution of chlorine atoms for the hydrogen atoms of the methyl radicals without substitution in the ring. In this manner, the trichloromethyl derivatives of the hydrocarbons are prepared for use in the practice of this invention.

The practice of this invention is preferably effected in the presence of a conventional catalyst, which includes various metal chlorides, such as ferric chloride, zinc chloride, antimony trichloride, stannic chloride, and aluminum chloride, and the acid catalysts such as sulfuric acid and p-toluene-sulfonic acid. These catalysts and others known to the prior art may be used if desired.

The improvement characterizing the invention involves the hydrolysis of the trichloromethyl groups by means of water which is chemically prepared in the reaction mass during the course of the hydrolysis. This method avoids the presence of local excesses of water which apparently occur when liquid water is added to the reaction mass. The water may be prepared in situ by any chemical reaction which does not chemically affect the acid chlorides prepared in the reaction. The most suitable reaction by which water can be prepared in the reaction mass is the reaction of dibasic acids in the presence of heat to form anhydrides. It is well known that only certain dicarboxylic acids are capable of forming anhydrides, for example, succinic acid, glutaric acid, ortho-phthalic acid, the naphthalenedicarboxylic acids having the carboxylic acid groups on adjacent carbon atoms, o-diphenic acid and maleic acid. Of these, the maleic acid is preferred since it can more readily be removed from the reaction mass by distillation.

The invention may be conducted in conventional chemical retorts capable of resisting the action of the hydrogen chloride evolved. It is usually desirable to charge the trichloromethyl-substituted benzenoid hydrocarbons into the retort, with the catalyst if desired, and adding the anhydride-forming dibasic acid at a rate which permits the controlled evolution of hydrogen chloride. After the chemical reaction has subsided, the acid chlorides may be conveniently separated from the catalyst and the maleic anhydride by vacuum distillation procedures.

In the practice of this invention for the preparation of isophthaloyl chloride or terephthaloyl chloride from commercial xylene, the separation of the isomeric bis(trichloromethyl) benzenes may be effected by freezing the mixture and crystallizing the hexachloro p-xylene and subsequently distilling the filtrate. The latter procedure is described and claimed in application Serial No. 733,433, filed March 8, 1947.

Further details of the practice of the present invention are set forth with respect to the following specific examples.

*Example 1*

A mixture of 469.5 grams of hexachloro-para-xylene and 4.1 grams of zinc chloride (0.5 percent by weight of the total reactants) was placed in a reaction flask provided with a stirring device. The contents of the flask were heated to 130° C. by immersion in an oil bath. Maleic acid (353 grams) was introduced gradually so as to provide a steady but not too vigorous evolution of hydrogen chloride. Throughout the reaction, the mixture was continuously stirred and the hydrogen chloride generated was removed. After all of the maleic acid had been added and a clear, transparent melt had been formed, the stirring and heating were continued for five minutes longer to insure a completed reaction. The reaction mixture was allowed to cool slightly and the clear liquid decanted from the zinc chloride into a distillation flask. The material was distilled through an efficient column at 9 mm. pressure and the fraction boiling to 125° C./9 mm. was separated. A 95 percent yield (289 grams) of product boiling between 125 and 127° C. at 9 mm. was recovered and identified as terephethaloyl chloride (M. P. 81–83° C.).

*Example 2*

Using a procedure identical to that used in the preceding example, except that hexachloro-m-xylene was used in place of the para derivative, an 88 percent yield of isophthaloyl chloride was recovered.

*Example 3*

Using a procedure identical to that of Example 2, except that a mixture of the meta and para xylene derivatives was used, an 89 percent yield of a mixture of terephthaloyl and isophthaloyl chloride was obtained.

Although the invention has been described with respect to specific examples, it is not intended that the details thereof shall be construed as limitations upon the invention except to the extent incorporated in the following claims.

I claim:

1. A method of preparing the acid chlorides of polybasic acids from compounds having the following structural formula

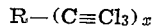

wherein R is an aromatic hydrocarbon radical having a valence equal to $x$, in which $x$ is a small whole number from 2 to 5 inclusive, and in which the valence bonds of R are attached to non-adjacent carbon atoms, which method comprises reacting said compounds with a dicarboxylic acid capable of forming an anhydride, and recovering the acid chloride.

2. A method of preparing the acid chlorides of polybasic acids from compounds having the following structural formula

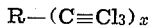

wherein R is an aromatic hydrocarbon radical having a valence equal to $x$, in which $x$ is a small whole number from 2 to 5 inclusive, and in which the valence bonds of R are attached to non-adjacent carbon atoms, which method comprises reacting said compounds, in the presence of a hydrolysis catalyst, with a dicarboxylic acid capable of forming an anhydride and recovering the acid chlorides by fractional distillation.

3. A method of preparing isophthaloyl chloride which comprises heating m-bis(trichloromethyl) benzene in the presence of a hydrolysis catalyst and a dicarboxylic acid capable of forming an anhydride, and recovering the isophthaloyl chloride by fractional distillation.

4. A method of preparing terephthaloyl chloride which comprises heating p-bis(trichloromethyl) benzene in the presence of a hydrolysis catalyst and a dicarboxylic acid capable of forming an anhydride, and recovering the terephthaloyl chloride by fractional distillation.

5. A method of preparing isophthaloyl chloride which comprises heating m-bis(trichloromethyl) benzene in the presence of a hydrolysis catalyst and maleic acid, and recovering the isophthaloyl chloride by fractional distillation.

6. A method of preparing terephthaloyl chloride which comprises heating p-bis(trichloromethyl) benzene in the presence of a hydrolysis catalyst and maleic acid, and recovering the terephthaloyl chloride by fractional distillation.

7. A method of preparing an acid chloride of a polybasic acid which comprises reacting di(trichlormethyl) benzene in which the trichlormethyl groups are attached to non-adjacent carbon atoms with a dicarboxylic acid capable of forming an anhydride, and recovering the acid chloride.

8. A method of preparing an acid chloride of a polybasic acid which comprises reacting, in the presence of a hydrolysis catalyst, di(trichlormethyl) benzene in which the trichlormethyl groups are attached to non-adjacent carbon atoms with a dicarboxylic acid capable of forming an anhydride, and recovering the acid chloride by fractional distillation.

NORMAN RABJOHN.

REFERENCES CITED

The following references are of record in the file of this patent:

UNITED STATES PATENTS

| Number | Name | Date |
|---|---|---|
| 1,557,154 | George | Oct. 13, 1925 |
| 1,880,169 | Bennett | Sept. 27, 1932 |
| 1,921,767 | Mills | Aug. 8, 1933 |
| 1,965,556 | Mills | July 3, 1934 |

FOREIGN PATENTS

| Number | Country | Date |
|---|---|---|
| 455,668 | Great Britain | 1936 |
| 820,697 | France | Nov. 16, 1937 |

OTHER REFERENCES

Karrer: "Organic Chemistry," Elsevier Publishing Co., Inc., New York, N. Y., 1946, 2nd ed. page 268.